US007921045B1

(12) United States Patent
Mamorsky (10) Patent No.: US 7,921,045 B1
(45) Date of Patent: Apr. 5, 2011

(54) METHOD FOR OFFERING INSURANCE PRODUCTS WITHOUT A COMPLETE AUDIT OF A POTENTIAL PURCHASER

(76) Inventor: Jeffrey Mamorsky, Greenwich, CT (US)

( * ) Notice: Subject to any disclaimer, the term of this patent is extended or adjusted under 35 U.S.C. 154(b) by 648 days.

(21) Appl. No.: 11/627,327

(22) Filed: Jan. 25, 2007

Related U.S. Application Data

(63) Continuation of application No. 11/469,779, filed on Sep. 1, 2006, now abandoned.

(60) Provisional application No. 60/713,800, filed on Sep. 2, 2005.

(51) Int. Cl.
*G06Q 40/00* (2006.01)
(52) U.S. Cl. ............................................. 705/35; 705/4
(58) Field of Classification Search .................. 705/4, 35
See application file for complete search history.

(56) References Cited

U.S. PATENT DOCUMENTS

| | | | | |
|---|---|---|---|---|
| 6,192,347 B1* | 2/2001 | Graff | ........................... | 705/36 R |
| 6,349,290 B1* | 2/2002 | Horowitz et al. | ............... | 705/35 |
| 7,107,239 B2* | 9/2006 | Graff | ........................... | 705/36 R |
| 7,246,086 B2* | 7/2007 | Araki et al. | ...................... | 705/26 |
| 7,319,970 B1* | 1/2008 | Simone | .............................. | 705/4 |
| 7,720,737 B2* | 5/2010 | D'Alessandro | ............. | 705/36 R |
| 2003/0233260 A1* | 12/2003 | Snell et al. | ........................ | 705/4 |
| 2004/0078243 A1* | 4/2004 | Fisher | ................................ | 705/4 |
| 2004/0172310 A1* | 9/2004 | Atlee et al. | ........................ | 705/4 |
| 2004/0172311 A1* | 9/2004 | Kauderer et al. | ................... | 705/4 |
| 2005/0010469 A1* | 1/2005 | Brown et al. | ................... | 705/10 |
| 2005/0182670 A1* | 8/2005 | Burgess | ............................ | 705/4 |
| 2005/0203834 A1* | 9/2005 | Prieston | ......................... | 705/38 |
| 2006/0089861 A1* | 4/2006 | King et al. | ........................ | 705/4 |
| 2006/0095319 A1* | 5/2006 | Cardwell | ........................ | 705/14 |
| 2008/0183506 A1* | 7/2008 | Mamorsky | ........................ | 705/4 |
| 2008/0221936 A1* | 9/2008 | Patterson | ........................ | 705/4 |
| 2010/0106533 A1* | 4/2010 | Alvarez | ............................ | 705/4 |

* cited by examiner

*Primary Examiner* — Narayanswamy Subramanian
(74) *Attorney, Agent, or Firm* — Greenberg Traurig LLP (57) ABSTRACT

A system and method are provided that identify and assess potential areas of exposure for insurance underwriting purposes and allows for the reduction or potential elimination of extensive analysis of such areas of exposure by insurance companies, and also allows for immediate underwriting of risk in reliance of the system's results. The system employs methodologies for use to determine compliance with laws, such as tax laws and retirement and welfare laws in international Class 35, and printed insurance application forms, investigative questionnaires and instructions manuals in international Class 16. In another aspect, the present invention is a system and method for measuring the adequacy of the security required under the fiduciary prudence and prohibited transaction provisions of The Employee Retirement Security Act of 1974, (ERISA), for loans made to a plan participant from the plan, which are secured by the participant's remaining account balance in the plan.

6 Claims, 4 Drawing Sheets

METHOD FOR OFFERING INSURANCE PRODUCTS WITHOUT A COMPLETE AUDIT OF A POTENTIAL PURCHASER

RELATED APPLICATIONS

This application is a continuation application of prior U.S. patent application Ser. No. 11/469,779 filed Sep. 1, 2006, which application claims the benefit of U.S. Provisional Application No. 60/713,800, filed Sep. 2, 2005. The entire contents of each aforementioned provisional and nonprovisional application are incorporated herein by reference.

BACKGROUND

In 1974, Congress enacted a law, the Employee Retirement Income Security Act (ERISA) which contains fiduciary rules, employee protection provisions and amendments to the Internal Revenue Code (IRC) that require employee benefit plan sponsors (employers or trustees in the case of multi-employer plans) to manage the assets held in employee benefit plans in accordance with their terms and in accordance with the law. Failure to do so can result in personal liability through litigation or governmental action or the imposition of monetary sanctions on plan sponsors in the case of operational or plan document violations-relating to retirement plans.

In order to avoid liability, the IRS and Department of Labor ("DOL") have established programs that require plan sponsors to establish a self-audit compliance process that identifies and corrects operational and plan document violations prior to an audit by IRS or DOL. The evaluation of compliance with ERISA and the IRS is accomplished through an investigation of documents and personnel records that normally involve a review of: (i) employee benefit plans, trusts, summary plan description brochures, administrative manuals, employee communications and other related documents; (ii) annual financial returns filed on behalf of employee benefit plans; (iii) personnel records which reflect the extent of compliance with procedures relating to employee enrollment, participation, vesting, change in employment status, contributions and benefit accrual, joint and survivor payment and notice requirements for married employees, proper calculation and payment of benefits and a myriad of other legal and regulatory requirements; and (iv) compliance with IRS requirements that prohibit discriminations in favor of highly compensated employees with respect to contributions and/or benefits provided by the employee benefit plan. This review is primarily conducted on-site at the location of the documents and personnel records across the country.

Plan providers typically wish to insure against the risk that, at some later date after conducting a compliance audit, the compliance audit will be found to be out of compliance by the regulating authority and a fine or some other penalty imposed. Insurers have responded to this market demand by offering various insurance products directed to insuring against these risks. For example, coverage under an insurance product may include coverage for IRS closing agreement penalties, the cost of corrections that are required by the IRS as a result of an IRS compliance audit, and earnings on any corrective contributions paid to the plan by the insured as a result of an IRS audit.

As part of matching the insurance product to the plan provider, the insurer must accurately assess the risks faced by the plan provider, value those risks and determine an appropriate insurance product, if any, to offer to the plan provider.

Often, there is an added complication that the information necessary to assess such risks is confidential to the plan provider and its confidentiality must be maintained to one degree or another, sometimes even from the insurer. Thus, the insurer must assess the risks based on information that the plan provider wishes to keep confidential from the insurer.

SUMMARY

A system and method are provided that identify and assess potential areas of exposure for insurance underwriting purposes and allows for the reduction or potential elimination of extensive analysis of such areas of exposure by insurance companies, and also allows for immediate underwriting of risk in reliance of the system's results. The system employs methodologies for use to determine compliance with laws, such as tax laws and retirement and welfare laws in international Class 35, and printed insurance application forms, investigative questionnaires and instructions manuals in international Class 16.

In another aspect, a system and method are described for measuring (i) the volatility of employer stock held by a qualified retirement plan so as to ascertain the prudence of a continued investment in such stock in compliance with the fiduciary requirements of Section 404(a)(1) of the Employee Retirement Income Security Act of 1974 ("ERISA") and (iii) the adequacy of the security required under the fiduciary prudence and prohibited transaction provisions of ERISA, Sections 404(a)(1), 406(b), 408(b)(1) and IRC Section 4975 (d)(1), for loans made to a plan participant from the plan, which are secured by the participant's remaining account balance in the plan.

In another aspect, a method of offering insurance coverage to a party subject to ERISA is disclosed. The method includes providing the party with a first questionnaire corresponding to a first coverage level and receiving from the party a completed first questionnaire. The method further includes analyzing the completed first questionnaire based on predetermined criteria including current legal interpretations of ERISA and then, based on results of the analysis, if the party is not eligible for an insurance product identifying to the party corrective actions to be performed that will make the party eligible for a first insurance product having the first coverage level.

In another aspect, a method for offering insurance products to a potential purchaser without performing a complete audit of the potential purchaser and without causing the potential purchaser's confidential information to be disclosed to the insurance product offeror is disclosed. The method includes developing a questionnaire corresponding to a first insurance product and identifying standards for evaluating the questionnaire. The questionnaire is then provided to the potential purchaser of the first insurance product, the questionnaire requiring confidential information from the potential purchaser and the potential purchaser is directed to complete the questionnaire. The method further includes directing a third party to receive and confidentially evaluate a completed questionnaire based on the standards, in which the completed questionnaire includes the confidential information of the potential purchaser. The method further includes receiving from the third party a non-confidential result of the evaluation, in which the non-confidential result includes a recommendation to offer or not to offer the first insurance product to the potential purchaser based on the standards and maintaining confidential, by the third party, the confidential information of the potential purchaser including maintaining the confidential information confidential from an offeror of the first insurance product.

In yet another aspect, a method and system for objectively managing an asset are disclosed. The method includes selecting a volatility index, the volatility index suitable to generate performance results from asset data, in which the performance results are indicative of a probability that the asset value may drop within a period of time. The method further includes defining one or more actions to be performed based on the performance results and periodically retrieving new asset data, in which the new asset data may be the current data for the asset being managed at the time of the analysis. The method further includes analyzing the new asset data to generate new performance results and, based on the new performance results, automatically performing at least one of the one or more actions.

In yet another aspect, a system is disclosed for objectively managing an asset. The system includes a data store containing current asset data associated with a plan subject to fiduciary management requirements and a management computing system. The management computing system has a data collection module adapted to receive the current asset data and an analysis module adapted to analyze the current asset data using a valuation method predetermined by an independent party to comply with fiduciary management requirements of the plan and further adapted to generate results. The management computing system further includes an action module adapted to initiate predetermined actions based on the results, the predetermined actions certified by the independent party to comply with fiduciary management requirements of the plan given the results.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of at least one embodiment of the invention.

In the drawings.

DETAILED DESCRIPTION

Reference will now be made in detail to illustrative embodiments of the present invention, examples of which are shown in the accompanying drawings.

Method and System for Offering Insurance Products

Figure 1:
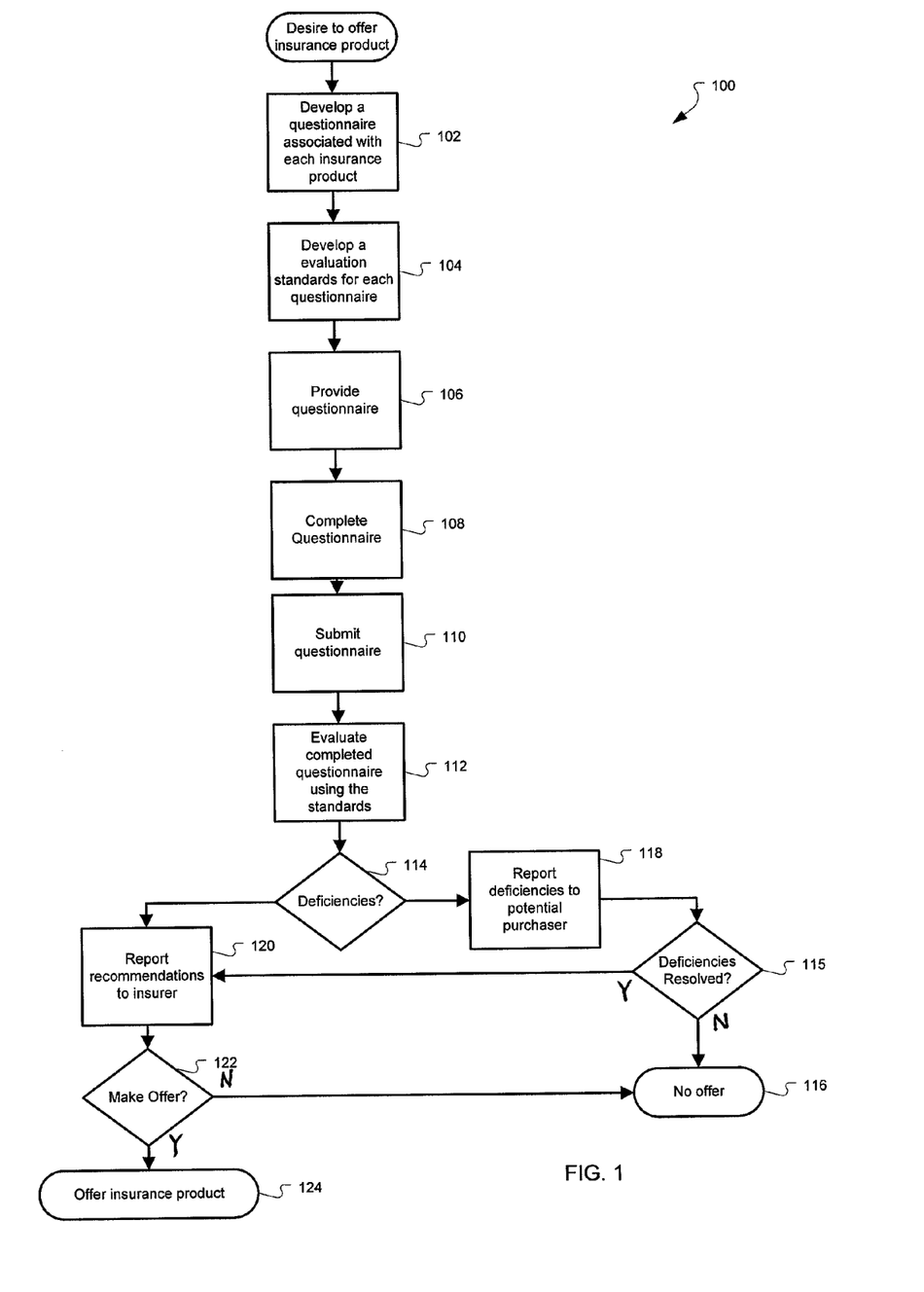
FIG. 1 is a flow chart illustrating the logical operations of an embodiment of a method for offering an insurance product to a potential purchaser in accordance with the present invention.

FIG. 1 is a flow chart illustrating the logical operations of an embodiment of a method for offering an insurance product to a potential purchaser in accordance with the present invention.

In the embodiment, an insurer wishes to cost-effectively offer one or more insurance products, such as insurance policies, policy forms, endorsements or expanded coverage under a pre-existing insurance product, to potential purchasers of those products. As part of the method, the potential purchaser's operations, practices, procedures and compliance must be evaluated in a cost-effective manner. However, these potential purchaser's operations, practices, procedures and compliance status may be confidential and need to remain confidential from the insurer.

In order to illustrate an embodiment of a system and method, the embodiments are discussed in terms of an example (which example is intended to be illustrative and not restrictive) in which the potential purchaser is an operator of an Employee Benefit Plan, referred to hereinafter as an "Employee Benefit Plan Operator," who wishes to insure against risks associated with potential non-compliance with U.S. Internal Revenue Service (IRS), the Sarbanes-Oxley Act of 2002 (SOX), or ERISA requirements. Thus, the insurer wishes to cost-effectively assess the Employee Benefit Plan Operator's compliance with self-audit internal control procedure requirements of the U.S. Internal Revenue Service, the Sarbanes-Oxley Act of 2002, and the Employee Retirement Income Security Act of 1974. In the example, the system employs methodologies for use to assess compliance with laws, such as tax laws and retirement and welfare laws in international Class 35, and printed insurance application forms, investigative questionnaires and instructions manuals in international Class 16.

Based on that assessment, the insurer wishes to determine the eligibility of the Employee Benefit Plan Operator for certain insurance products, such as a new fiduciary liability insurance policy or expanded coverage or additional benefits in an existing fiduciary liability coverage insurance product. For example, coverage under an insurance product may include coverage for IRS closing agreement penalties, the cost of corrections that are required by the IRS as a result of an IRS compliance audit, and earnings on any corrective contributions paid to the plan by the insured as a result of an IRS audit. It should be noted, however, that one skilled in the art will recognize that the methods and systems described herein can be adapted to any potential purchaser wishing to insure against any potential risk, including but not limited to risks associated with non-compliance with government regulations.

In FIG. 1, the method starts when the insurer wishes to offer one or more insurance products to qualified Employee Benefit Plan Operators whereby the insurer will offer coverage for IRS closing agreement penalties, the cost of corrections that are required by the IRS as a result of an IRS compliance audit, and earnings on any corrective contributions paid to the plan by the insured as a result of an IRS audit. The coverage may or may not include payments required to correct funding shortfalls in underfunded employee benefit plans.

In order to cost-efficiently offer insurance products, one or more questionnaires are first developed in a develop questionnaire operation 102. Each questionnaire developed is associated with a different insurance product. Each questionnaire contains questions for the Employee Benefit Plan Operator concerning the self-audit internal control procedure requirements of the U.S. Internal Revenue Service (IRS), the Sarbanes-Oxley Act of 2002, and the Employee Retirement Income Security Act of 1974, or some other government requirement. The questions may be developed based on the language of the applicable statutes, the current legal interpretations of the statutes, and/or best practices published by auditing authorities. At least some of the questions require the Employee Benefit Plan Operator to provide confidential business information in order to complete the questionnaire.

The questionnaires may be developed by the insurer, by one or more experts such as law firms, accounting firms, business ethics consultants or the like, or as a joint product between the insurer and one or more experts. In one embodiment, each questionnaire is developed jointly by the insurer and an auditor, such as a law firm, so that the contents of the questionnaire are confidential between the insurer and auditor.

A set of standards for evaluating completed questionnaires is also developed in a develop evaluation standards operation 104. The develop evaluation standards operation 104 includes developing any standards, requirements or other criteria that will be used to evaluate each questionnaire. The standards developed are such that evaluating a questionnaire completed by an Employee Benefit Plan Operator using the standards will result in an identification of one or more of a set of recommendations including: a recommendation for the insurer to offer the insurance product associated with the questionnaire to the Employee Benefit Plan Operator; a recommendation for the insurer to offer the some other insurance product to the Employee Benefit Plan Operator; a recommendation for the Employee Benefit Plan Operator to correct one or more deficiencies identified by the evaluation in order to be eligible for the insurance product associated with the questionnaire or some other insurance product; and a recommendation for the insurer not to offer the first insurance product to the Employee Benefit Plan Operator.

The standards may be developed by the insurer, by one or more experts such as law firms, accounting firms, business ethics consultants or the like, or as a joint product between the insurer and one or more experts. In one embodiment, evaluation standards are developed jointly by the insurer and an auditor, such as a law firm, so that how the questionnaire will be evaluated and the potential recommendations are confidential between the insurer and auditor.

After the questionnaire and associated evaluation standards have been developed, the questionnaires are provided to as Employee Benefit Plan Operator interested in purchasing the associated insurance product in a provide questionnaire operation 106. In an embodiment of the present invention, the questionnaires are obtained from an auditor associated with the insurer or from the insurer. If obtained from an auditor, it is possible to maintain confidentiality between the auditor and the Employee Benefit Plan Operator so that the Employee Benefit Plan Operator's desire for the insurance product and outcome of the process are maintained in confidence between the auditor and the Employee Benefit Plan Operator until such time as it is necessary to disclose it to the insurer or other party.

The provide questionnaire operation 106 may also be part of or associated with an auditor's limited or comprehensive audit of the Employee Benefit Plan Operator's self-audit internal control procedures. Such an audit identifies a plan sponsor's legal risks, provides comprehensive solutions to correct deficiencies and implements operational safeguards to protect plan fiduciaries. For example, a limited audit may be performed such as that described in U.S. patent application Ser. No. 10/466,831 by Jeffrey Mamorsky (Patent Publication No. 2005-0131784), titled "Audit System and Method," which reference is hereby incorporated herein by reference and is further provided as Appendix A. Furthermore, the questionnaire and the limited audit may be concurrently developed to be complimentary in order that the limited audit cost-effectively verifies some or all of the responses to the questionnaire.

The provide questionnaire operation 106 may also be part of or associated with an auditor's more comprehensive audit of the Employee Benefit Plan Operator's self-audit internal control procedures. Such a comprehensive audit may include in addition to a review and analysis of the prospective Employee Benefit Plan Operator's responses to the questionnaire, review of the employee benefit plan document, summary plan description and the latest Form 5500 Annual Return, including testing by the auditor of the plan's internal control procedures through the use of a sample of participant files. A comprehensive audit may also include analysis of the Employee Benefit Plan Operator's self-audit internal control procedures and evaluation of its compliance with SOX, IRS and ERISA self-audit requirements. In the course of a comprehensive audit and each subsequent annual audit, the auditor will advise the Employee Benefit Plan Operator on certain SOX, IRS and ERISA self-audit requirements and how to fulfill them, advice which the Employee Benefit Plan Operator can use as a basis and support, as of the date of the Report, to establish compliance with said requirements.

Next, the Employee Benefit Plan Operator completes the questionnaire in a complete questionnaire operation 108 and supplies whatever answers and information, including information the Employee Benefit Plan Operator wishes to remain confidential from the insurer and other parties. In this example, such answers and information may include copies of the Employee Benefit Plan Operator's self-audit procedures, copies of recent self-audits and other confidential information related to the requirements of the U.S. Internal Revenue Service, the Sarbanes-Oxley Act of 2002, and the Employee Retirement Income Security Act of 1974, or some other government requirement.

The completed questionnaire is submitted to and received by the auditor under the terms of a confidentiality agreement in a submit completed questionnaire operation 110. As mentioned above, such confidentiality may even extend to the insurer so that the insurer has no knowledge of the potential purchaser's identity or desire to obtain the insurance product.

The auditor then evaluates the received questionnaire using the predetermined standards in an evaluation operation 112. This allows the insurer to have knowledge of the standards used in the evaluation without having any of the confidential information of the Employee Benefit Plan Operator being disclosed to the insurer. The Employee Benefit Plan Operator is assured that its confidential information will be kept confidential (in accordance with the terms of the confidentiality agreement) without having any knowledge of how the questionnaire will be evaluated.

The results of the evaluation operation 112 include at least one recommendation based on the evaluation standards. Additional results, such as a report concerning the auditor's evaluation of Employee Benefit Plan Operator's operations, may also be produced in addition to the recommendation. As discussed above, the results of the evaluation may include identification of one or more of a set of recommendations including: a recommendation for the insurer to offer the insurance product associated with the questionnaire to the Employee Benefit Plan Operator; a recommendation for the insurer to offer the some other insurance product to the Employee Benefit Plan Operator; a recommendation for the Employee Benefit Plan Operator to correct one or more deficiencies identified by the evaluation in order to be eligible for the associated insurance product or some other insurance product; and a recommendation for the insurer not to offer the first insurance product to the Employee Benefit Plan Operator.

After the evaluation operation 112 is performed, a first determination operation 114 determines if the results include a recommendation for the Employee Benefit Plan Operator to correct one or more deficiencies identified by the evaluation in order to be eligible for the associated insurance product or some other insurance product. If there are no such deficiencies, then a report recommendations to insurer operation 120 is performed, which is described below.

However, if there are deficiencies then the deficiencies are reported to the Employee Benefit Plan Operator in a report deficiencies operation 118. Such a report may cite the deficiencies and may further identify corrective actions that the Employee Benefit Plan Operator may take. Additionally, the deficiencies may be related to deficiencies in the Employee Benefit Plan Operator's completion of the questionnaire and the report may include a request for additional information necessary to complete the questionnaire.

The auditor and Employee Benefit Plan Operator may then work to resolve any deficiencies reported in the report deficiencies operation 118. Ultimately, a second determination operation 115 determines if the deficiencies can be resolved to the extent that a recommendation can be made to the insurer. If deficiencies can not be resolved and no recommendation can be made based on the standards developed, the method 100 ends in no offer being made to the Employee Benefit Plan Operator in a no offer operation 116. In this outcome, it is possible that the insurer has remained completely unaware of the business between the auditor and the Employee Benefit Plan Operator.

If the second determination operation 115 determines that the deficiencies are resolved to the extent that a recommendation can be made to the insurer, then the appropriate recommendation is reported to the insurer in the report recommendation operation 120.

The report recommendation operation 120 includes reporting the recommendation or recommendations that are part of the results generated by the evaluation. Because the questionnaire and the standards for its evaluation are known to the insurer, even though the confidential information of the Employee Benefit Plan Operator is not known, the insurer can be confident of the accuracy and relevance of any recommendations generated by the evaluation operation 112. The report recommendation operation 120 also may include reporting additional information, in addition to recommendations, as part of the results of the evaluation and may further include some disclosure of confidential information of the Employee Benefit Plan Operator. Any such disclosure would be according to the confidentiality agreement between the Employee Benefit Plan Operator and auditor.

Based on the information provided by the auditor in the report recommendation operation 120, the insurer then determines whether to make an offer in a third determination operation 122. The insurer may decide to offer, in an offer insurance product operation 124, the insurance product associated with the questionnaire to the Employee Benefit Plan Operator or some other insurance product. Alternatively the insurer may decide to decline to offer the Employee Benefit Plan Operator any insurance product in the no offer operation 116. The third determination operation 122 may be completely at the discretion of the insurer and may be based on additional information not available to the auditor or based on additional evaluations performed by the insurer.

The above discussion with reference to FIG. 1 is but one possible embodiment of the present invention. Other embodiments are possible and considered within the scope of the present invention. For example, the auditor may provide a first questionnaire of limited scope (hereinafter referred to as a "mini-questionnaire") in the provide question operation 106 as part of a marketing campaign. Marketing materials and the mini-questionnaire are provided directly to employee benefit plans and sponsors of employee benefit plans as deemed appropriate by the auditor, or potentially to professionals associated with such plans, e.g., brokers who handle insurance coverage for employee benefit plans and sponsors of employee benefit plans. An example of such marketing materials is provided in Appendix B. The recipients of the mini-questionnaires provided in this manner may not be divulged to the insurer.

In an embodiment, insurance products are graduated and an associated questionnaire created for each product. For example (which example is intended to be illustrative and not restrictive), a first tier of insurance coverage may be offered as a first insurance product to prospective Employee Benefit Plan Operators, whereby they may qualify for coverage with a first dollar value limit of liability at no cost. This first insurance product may be offered as an endorsement to existing insurer fiduciary liability policies that are to be issued as either new business or renewals or which are in effect at the time the endorsement is added. This first tier of coverage may or may not be provided through a stand-alone policy without the purchase of fiduciary liability insurance from insurer. In order to qualify for this first insurance product, prospective Employee Benefit Plan Operators may first be required to complete and submit an associated questionnaire, such as for example the mini-questionnaire. If the prospective Employee Benefit Plan Operator satisfies the mini-questionnaire evaluation or makes corrections recommended by the auditor as a result of the mini-questionnaire evaluation, the Employee Benefit Plan Operator may be eligible and offered an insurance product including coverage with a first limit of liability at no cost.

In an embodiment, prospective Employee Benefit Plan Operators may also qualify for a second, enhanced insurance product having greater coverage than the first tier of coverage associated with the first insurance product. This second, enhanced insurance product may be offered as an endorsement to the insurer's fiduciary liability policies that are to be issued as either new business or renewals or which are in effect at the time the endorsement is added. In addition, the second insurance product may be offered only as a stand-alone policy of insurance independent of any fiduciary liability coverage. In order to qualify for this enhanced coverage, the prospective Employee Benefit Plan Operator is required to complete a second questionnaire associated with the second insurance product. Eligibility for the second insurance product may also require that the Employee Benefit Plan Operator undergo an audit not required for the eligibility for the first insurance product, which may encompass a Plan Governance Audit as well as an IRS Compliance Audit.

Based on the questionnaire evaluation, the auditor will prepare an audit report, such as the Fiduciary Audit® Annual Report described in Appendix B, to be given to the prospective insured. Pursuant to the agreement between the auditor and prospective Employee Benefit Plan Operators, the prospective insured will not be permitted to use the results of the evaluation operation 112 for any purpose other than 1) to apply for an insurance product coverage from the insurer, or 2) in-house to remedy any compliance defects identified by the auditor other than to address legal compliance (exclusive of insurance coverage for such compliance). Also, the prospective Employee Benefit Plan Operator may not be permitted to disclose or make available the report to any third party other than to address legal compliance (exclusive of insurance coverage for such compliance).

The auditor, as part of the report recommendation operation 120, may provide the insurer with only the recommendation. The results of the evaluation operation 112, however, may include a report that contains the auditor's recommendations for correction, if any, based on the documents reviewed.

Pursuant to the agreement between the auditor and prospective Employee Benefit Plan Operator, the prospective Insured may agree to execute a limited waiver permitting the auditor to disclose some or all of the report to the insurer in the event of a claim under the ultimately offered insurance product. The recommendation to the insurer may contain the auditor's opinion as to whether or not enhanced insurance coverage should be offered to the prospective Employee Benefit Plan Operator, or whether additional information is required to render a recommendation.

If, in the first determination operation 114 the auditor is unable to recommend the prospective Employee Benefit Plan Operator for coverage due to compliance defects within the reviewed benefit plan, rather than recommend against coverage, the auditor may provide the insurer a qualified recommendation to the insurer. A qualified recommendation to insurer shall identify those compliance defects that should either be excluded from coverage or corrected prior to the inception date of coverage. A qualified recommendation to the insurer may only be provided to the insurer if the prospective Employee Benefit Plan Operator agrees to execute a limited waiver permitting the auditor to disclose compliance defects to the insurer and to recommend that those defects either be excluded from coverage or corrected prior to the inception date of coverage. If the prospective Employee Benefit Plan Operator satisfies the evaluation for an enhanced second insurance product, before or after making corrections recommended by the auditor as a result of the questionnaire evaluation, the Employee Benefit Plan Operator will be eligible for enhanced coverage, at the insurer's discretion. The incorporation of coverage exclusions in, and the pricing for, any enhanced coverage offered by the insurer will be subject to the sole underwriting discretion of the insurer.

In an embodiment, an Employee Benefit Plan Operator that elects to submit a questionnaire (instead of having the auditor perform a comprehensive operational audit) will be required to execute a limited waiver permitting the auditor to disclose the completed questionnaire to the insurer in the event of a claim under the policy.

In an embodiment, in the event of a claim the insurer and the Employee Benefit Plan Operator may be required to designate the auditor as defense counsel. This requirement preserves the confidentiality of all parties by preserving the confidentiality of the questionnaire and its associated standards while also preserving the confidentiality of the Employee Benefit Plan Operator's information. In the embodiment, the auditor must be a law firm offering legal services including corporate audit services and insurance defense services.

In an embodiment, subsequent annual evaluations for renewal of the insurance product may be performed by submission of new questionnaires. A subsequent annual evaluation for renewal of the insurance product may include limited testing of internal control procedures as determined by the auditor.

In an embodiment, the auditor may indemnify the insurer for any liability or loss that the insurer may incur in the event of any deliberately dishonest, malicious or fraudulent act, concealment or intentional omission by the auditor in conducting any evaluation. This further serves to assure the insurer of the quality and accuracy of the evaluation performed by the auditor.

It should be noted that the selection of specific example of Employee Benefit Plan Operator compliance with IRS, SOX and ERISA requirements is illustrative only, and are not intended to limit the invention. It is within the scope of this invention to use the methods described herein to offer insurance products to employee benefit plans or to corporate sponsors of employee benefit plans that are in financial distress or financial rehabilitation, or that are not fully funded in conjunction with a full operation review, instead of a limited audit. It should be further notice that while each of the illustrations above show a single insurer, it is squarely within the scope of this invention to provide questionnaires and evaluations that are accepted by multiple insurers, thus permitting a standardized application procedure for associated insurance products. Where a plurality of insurers receive the recommendations, they may offer competing products or develop a combined insurance product to offer the Employee Benefit Plan Operator.

ERISA Plan Management Using a Volatility Index

The Employee Retirement Income Security Act of 1974 (Public Law No. 93-406, 88 Stat. 829, Sep. 2, 1974), commonly known as ERISA, is a United States federal statute enacted to protect interstate commerce and the interests of participants in employee benefit plans and their beneficiaries, by requiring the disclosure and reporting to participants and beneficiaries of financial and other information with respect thereto, by establishing fiduciary requirements including standards of conduct, responsibility, and obligation for fiduciaries of employee benefit plans, and by providing for appropriate remedies, sanctions, and ready access to the Federal courts.

ERISA requires pension plans to provide for vesting of employees' pension rights after a specified minimum number of years and to meet certain funding requirements. It also establishes an entity, the Pension Benefit Guaranty Corporation (PBGC), that will provide some minimal benefits coverage in the event that a plan does not, on termination, have sufficient assets to provide all the benefits employees and retirees have earned. Later amendments to the Act require employers who are withdrawing from participation in a multiemployer pension plan that has insufficient assets to pay all of employees' vested benefits to pay their pro rata share of that unfunded vested benefits liability.

While employers bear investment risk of plan assets in defined benefit plans, employers also have fiduciary responsibility both to participants and to the plan for defined contribution plans. However, ERISA Section 404(c) provides the guidelines for employers who wish to off load the investment risk if they can provide a range of investment choices and give their employees sufficient control over their individual accounts. Title I also covers prohibited transactions and the ten percent limit on employer stock.

To comply with ERISA fiduciary responsibilities, the management of a company's employee retirement plans that include that company's stock must show that all management decisions are objective and in the best interest of the employees. However, often the management team of an ERISA retirement plan includes the same people that also have a fiduciary duty to the company's shareholders. Thus, competing fiduciary duties may arise in some situations. Generally, these situations occur because the duty to the shareholders to maintain a stock's value may conflict with the duty to objectively manage that same stock within an ERISA retirement plan when the plan and the company are managed by the same people. For example, one situation that commonly arises is how to objectively measure the security in an ERISA retirement plan to cover loans made to a plan participant. Another situation arises is how to make long term decisions regarding the management of the stock portfolio overall in an ERISA retirement plan in order to prove that the management decisions were objectively made.

Aspects of the present invention include systems and methods for managing ERISA retirement plans that remove discretion from the ERISA plan managers by substituting an objective decision making process and methodology in place of subjective management decisions. Such process and methodology include using an objective measure of the company's stock value, referred to herein as a volatility index, in the decision making process. The volatility index is a means for objectively valuing a stock that is predetermined and approved by the management of the plan. In essence, after approval of a volatility index, all appropriate management decisions are driven by the results of the volatility index analysis of the stock.

Volatility most frequently refers to the standard deviation of the change in value of a financial instrument with a specific time horizon. It is often used to quantify the risk of the instrument over that time period. Volatility is typically expressed in annualized terms, and it may either be an absolute number (5$) or a fraction of the initial value (5%).

For a financial instrument whose price follows a Gaussian random walk, or Wiener process, the volatility increases by the square-root of time as time increases. Conceptually, this is because there is an increasing probability that the instrument's price will be farther away from the initial price as time increases.

More broadly, volatility refers to the degree of (typically short-term) unpredictable change over time of a certain variable. It may be measured via the standard deviation of a sample, as mentioned above. However, price changes actually do not follow Gaussian distributions. Better distributions used to describe them actually have "fat tails" although their variance remains finite. Therefore, other metrics may be used to describe the degree of spread of the variable. As such, volatility reflects the degree of risk faced by someone with exposure to that variable.

Volatility indexes may take many different forms. The Chicago Board Options Exchange Volatility Index (VIX), measures how much premium investors are willing to pay for options as insurance to hedge their equity positions. The VIX is calculated using a weighted average of implied volatility of At-The-Money and Near-The-Money striked in options on the S&P 500 Index futures. There also exists the VXN index (Nasdaq 100 index futures volatility measure) and QQV (QQQQ volatility measure).

Other types of potentially applicable volatility indexes include methods for estimating the true market value based on the fundamental economic health of the company and, potentially, estimate the amount by which earnings should exceed or fall short of other companies with comparable risk. Such volatility indexes may include one or more value-based management methods to value a company, such as "market value added," "cash value added," "economic margin" and "economic value added" calculations.

For example, the economic value added (EVA) method allows the true economic profit of a corporation to be calculated as a net operating after taxes profit minus a charge for the opportunity cost of the capital invested. EVA allows for performance to be evaluated over time and is based on the idea that a business must cover both the operating costs and the capital costs. EVA is just one example of a method for valuing a company that could be used as, or as part of, a volatility index for use in valuing an ERISA retirement plan.

Figure 2:
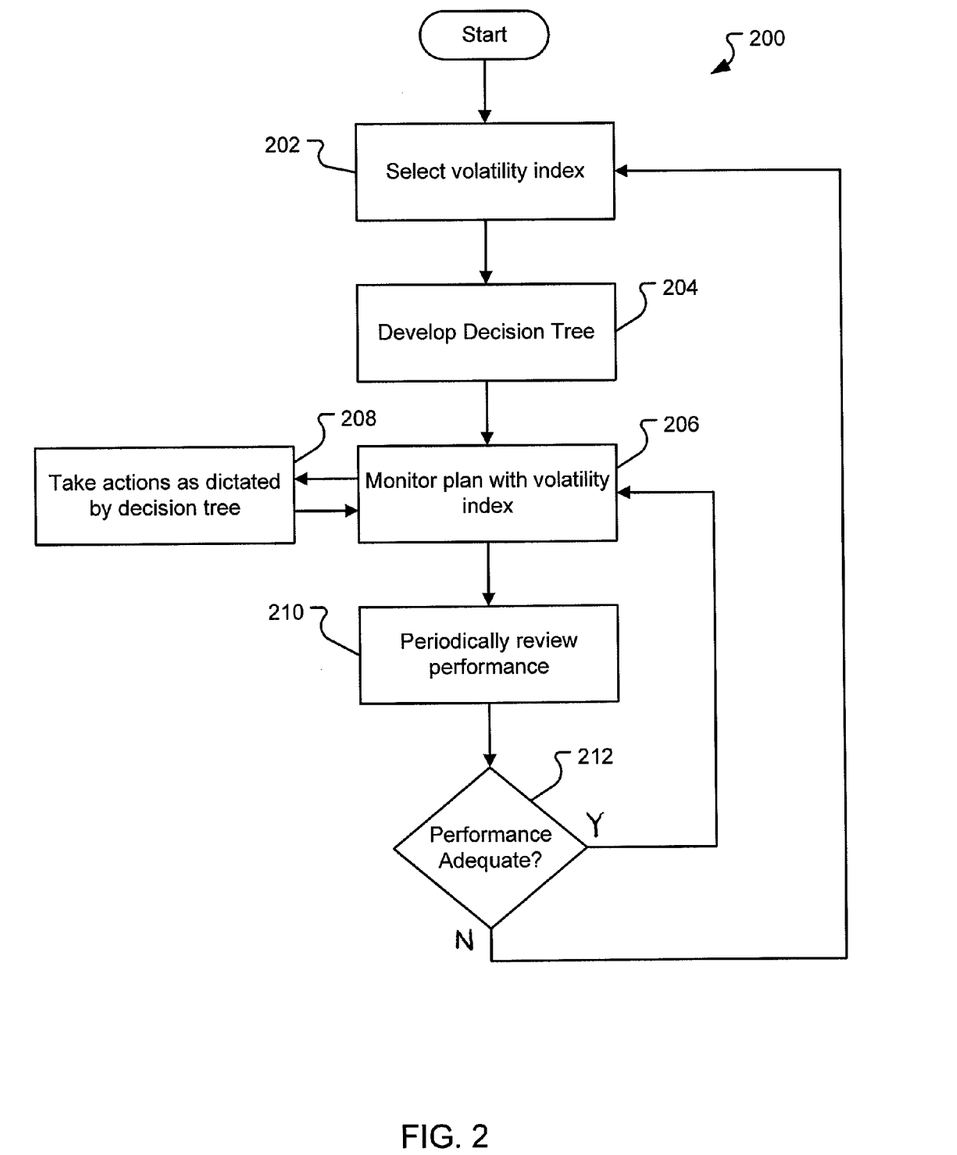
FIG. 2 illustrates an embodiment of a high-level method for using a volatility stock index in the management of an ERISA plan.

FIG. 2 illustrates an embodiment of a high-level method for using a volatility stock index in the management of an ERISA plan. In the method 200 shown, a volatility index is selected and approved by the management of the ERISA plan in a plan selection operation 202. This may include creating a new volatility index from scratch, or using a previously developed index. In this operation, different volatility indexes may be evaluated based on past data in order to compare their performance.

A decision tree is then developed to determine how to interpret the results of the volatility index and what actions should be taken based on those results in a develop decision tree operation 204. In this operation 204, the ERISA plan managers develop an objective decision making process for management of the ERISA fund. The decision tree is based on the volatility index and includes predetermined actions based on the results of the volatility index when applied to the ERISA plan data. The develop decision tree operation 204 results in a predetermined management strategy that removes subjectivity and, thus, is compliant with the ERISA fiduciary requirements. The decision tree development may include a certification by an outside auditor that the decisions in each possible scenario is appropriate and meets best practices.

After the develop decision tree operation 204, the plan is then actively monitored over time using the volatility index in a monitor operation 206. The monitoring may be done daily, weekly, or hourly depending on the volatility index selected.

Depending on the results of the volatility index identified during the monitoring operation 206, one or more actions may be dictated based on the predetermined decision tree. If an action is dictated, a take action operation 208 may be performed. In this way, the action is objectively performed solely based on the results of the volatility index and the predetermined decision tree.

In the embodiment shown, the performance of the volatility index and decision tree is periodically reviewed by the plan fiduciary and management team in a periodic review operation 210. If the performance is found to be adequate in a determination operation 212, then no changes are made and the monitor operation 206 continues. If, however, the performance is deemed to be poor, the method 200 is repeated so that a new volatility index or a new decision tree may be objectively selected.

Figure 4:
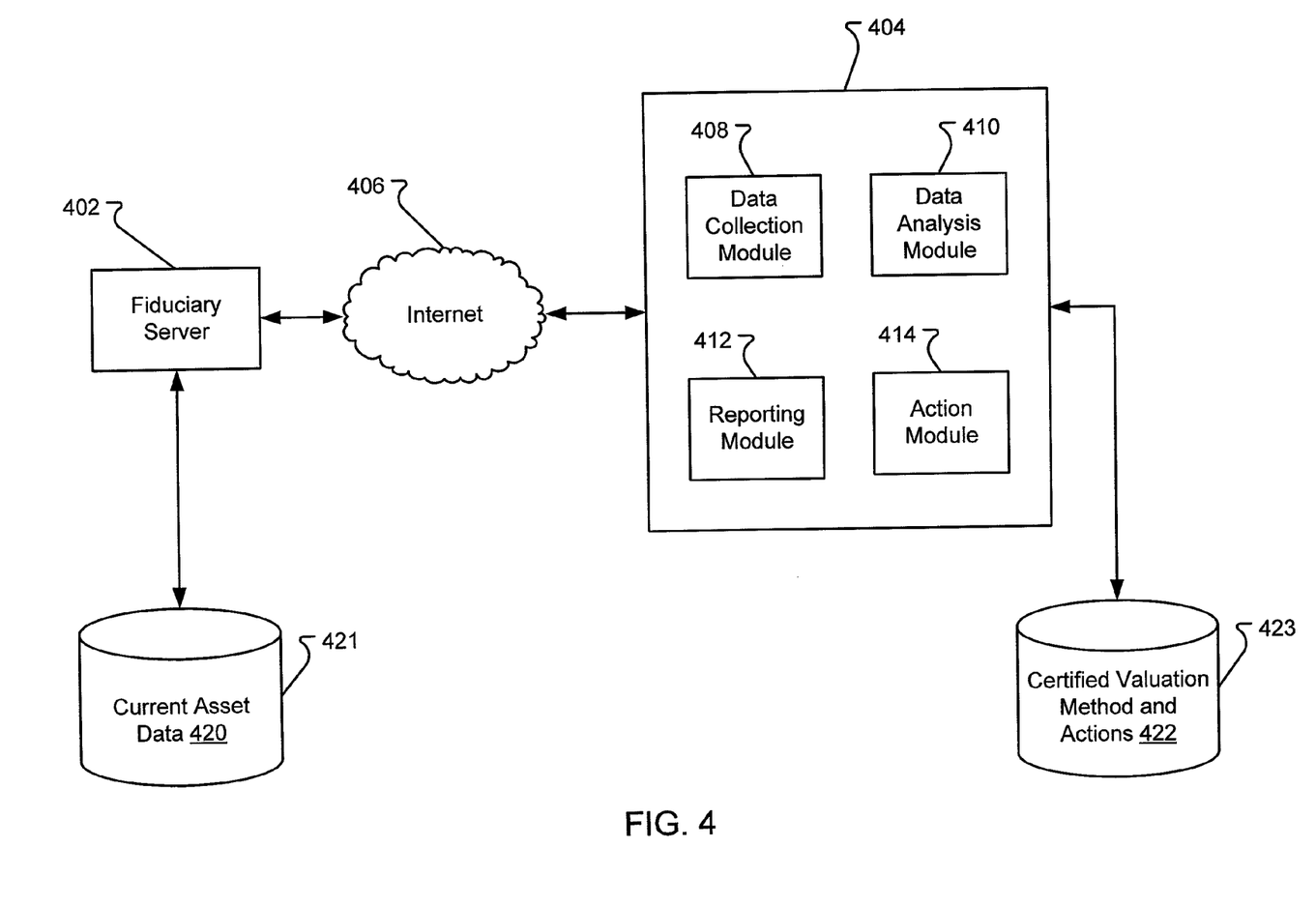
FIG. 4 illustrates an embodiment of a system adapted to use a volatility index as part of the objective management of assets in a plan subject to fiduciary requirements by a fiduciary.

FIG. 4 illustrates an embodiment of a system adapted to use a volatility index as part of the objective management of assets in a plan subject to fiduciary requirements by a fiduciary. In the embodiment shown, the fiduciary has previously selected a volatility index or some other predetermined method for valuing the assets in the plan and projecting future trends in the value. Furthermore, the fiduciary has determined a set of actions in a decision tree that dictates what should be done for any given result generated by the volatility index or other valuation method. The actions and volatility index/valuation method have been certified as complying with the fiduciary requirements by some third party auditor or other recognized expert.

In an embodiment, a computing device, such as the fiduciary device 402 and management device 404 discussed in greater detail below, includes a processor and memory for storing data and software. In an embodiment, computing devices are further provided with operating systems and can execute software applications in order to manipulate data. In the computing device, local files, such as data files, may be stored on a mass storage device (not shown) that is connected to or part of any of the computing devices described herein. A mass storage device and its associated computer-readable media, provide non-volatile storage for the associated computing device. Although the description of computer-readable media contained herein refers to a mass storage device, such as a hard disk or CD-ROM drive, it should be appreciated by those skilled in the art that computer-readable media can be any available media that can be accessed by the computing device 402, 404. In an alternative embodiment, data may be stored on a database maintained as a separate device.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

The system 400 includes a fiduciary computing device 402, which could be owned and operated by the fiduciary, that contains the current asset data. The fiduciary computing device 402 may be a server computer, a database, or may be some other computing device as are known in the art. As mentioned above the fiduciary computing device 402 may be owned and operated by the fiduciary of the plan(s) or may be a third party device operated by the plan administrator.

The current asset data 420 include information such as the number of shares owned in the plan or plans being managed and the current balance of loans and other liabilities associated with each plan. Typically, the data are maintained by the fiduciary or fiduciary's designated plan administrator that responsible for the day to day management of the plan, for example with respect to the approval of loans taken against the plan so that the current asset data are, in fact, current. The current asset data are stored in a current asset datastore 421 which may be part of, or separate device in communication with, the fiduciary device 402. The current asset data 420 are updated regularly so that the current asset data 420 transmitted to the management computing device 404 is up to date and accurately reflects the current assets of the plan or plans being managed by the system 400.

The fiduciary computing device 402 is connected to a management computing device 404 via a network 406. In the embodiment shown, the network is the Internet 406, however, any communication network or combination of networks may be used as long as the two devices 402, 404 can communicate. Examples of suitable networks 406 include a direct and private communication network, a local area network, a wide area network, microwave communication, or a wireless network. Any communication means between devices, whether now known or later developed, may be used. Communications on the network 406 may be secured either by encryption of data or by securing access to the network 406 itself.

The management computing device 404 may be a server computer, a database, or may be some other computing device as are known in the art. In the embodiment shown, the management computing device 404 may be owned and operated by an independent third party tasked with managing the assets in accordance with the certified valuation method and actions. In an alternative embodiment, the management computing device 404 may be owned and operated by an independent third party tasked only with tracking the valuation, the actions being performed by yet another party based on the valuation results and the predetermined actions.

In the embodiment, the plan is monitored by a daily service in which the Plan Administrator provides all of the accounts held in the plan to the management device 404 such as via a secure File Transfer Protocol (sFTP). The asset data 420 is transmitted via the network 406 to the management computing device 404. The asset data 420 of the accounts are processed using the pre-certified valuation method, for example overnight, and files with statistics and reports may be generated showing the results of the analysis. These files and reports may be transmitted to the plan fiduciary for the benefit of the Plan Fiduciary, to support an independent fiduciary or to an independent party tasked with performing the actions.

In the embodiment shown, the management computing device 404 is provided with a data collection module 408. The data collection module 408 communicates with the fiduciary device 402 and receives the current asset data 420. In an embodiment, the data collection module 408 may periodically request the current asset data 420 from the fiduciary device 402. In addition, the data collection module 408 may prepare the data 420 for analysis.

The management computing device 404 is further provided with an analysis module 410 that analyzes the current asset data using the predetermined volatility index or other valuation method. The analysis products results which may then be transmitted to another device or used to determine if any of the predetermined actions are triggered or should otherwise be performed.

In the embodiment show, the management computing device 404 is further provided with a reporting module 412. The reporting module 412 may issue reports to any designated system via the network 406. The reports may include the current asset data analyzed, results of the analysis, the actions triggered, the actions performed in response to the results, any alerts or warnings triggered, or any combination of the aforementioned.

In the embodiment shown, the certified volatility index and actions 422 for each plan being managed are stored as data in a secure datastore 423. If the management device 404 manages more than one asset, a different certified volatility index and set of actions 422 may be stored.

In the embodiment shown, the management computing device 404 is further provided with an action module 414. The action module 414 automatically performs or otherwise initiates the actions based on the results of the analysis. Thus, the action module 414 is adapted to initiate predetermined actions based on the results, in which the predetermined actions have been previously certified by the independent party to comply with fiduciary management requirements of the plan in the event that the results cross some threshold. In an embodiment, the action module 414 is adapted to purchase hedging trades automatically and electronically. In an alternative embodiment, the action module is adapted to issue a purchase request to a broker or other party or to otherwise alert some party that one or more specific and pre-certified actions are to be performed in light of the results of the analysis of the current asset data.

For example, in a loan management context the action performed by the action module 414 may include granting or denying a loan request that was transmitted with the current asset data based on the results. Thus, the system objectively can be adapted to manage the adequacy of the security for the loan in an objective manner that has been pre-certified as complying with the fiduciary requirements associated with the plan.

The following is a description of an embodiment of a valuation method in the form of a volatility index that may be used to monitor the assets of each 401 (k) or other ERISA plan. Various aspects of the value of the plan may be monitored by the software on the management device 404 or other system server including market price drop, concentration by weight, the risk contribution, stress, downside risk, and a what if analysis. Other aspects may also be included based upon the decision of the team responsible for developing the volatility index. A discussion of some of the aspects that may be monitored by an embodiment are described in greater detail below.

In addition to the monitoring, each aspect of a plan that is monitored may have one or more associated action thresholds or triggers that are defined as part of the creation of the decision tree. In an embodiment, each aspect may be assigned a warning trigger point and an alert trigger point. A warning trigger point may be a result, such as a percentage drop in value, at which a warning is automatically generated to the management of the plan allowing the management team to take additional precautions to protect the value of the plan. Similarly, an alert trigger point may be a result that is automatically generated at which some additional action should be taken by the management.

Such trigger points may also be used to trigger specific and automatic actions to hedge against a drop in value in the plan, such as buying an option, buying insurance, or other actions to protect the plan's value. Such actions that could be performed to hedge against a loss in value are known in the art, such as a pairs trade, a contract for differences, a futures contract, a forward contract, and insurance, and any suitable action or method may be used, as long as it meets the fiduciary requirements. In the embodiments described below of different aspects that may be included in a volatility index, two trigger points are provided—a warning trigger point and an alert trigger point.

ERISA Loan Security Volatility Index

An embodiment of the ERISA volatility index management system is a system and method for measuring the adequacy of the security required under the fiduciary prudence and prohibited transaction provisions of The Employee Retirement Security Act of 1974, (ERISA), Sections 404(a)(1), 406(b), 408(b)(1) and IRC Section 4975(d)(1), for loans made to a plan participant from the plan, which are secured by the participant's remaining account balance in the plan. The system and method, then, include an underwriting process to assist the plan fiduciary in meeting the prudence requirements of ERISA with respect to the operation of the plan's loan provisions. Furthermore, to comply with ERISA's fiduciary requirements, the underwriting processes must be substantially objective.

Often, participants in an ERISA plan wish to take out a loan using the balance in their ERISA plan as collateral. Such loans are beneficial to the participants as well as to the plan administrator and are allowed under ERISA, as long as balance remaining in the plan (the security for the loan) is adequate as defined by the fiduciary prudence and prohibited transaction provisions of The Employee Retirement Security Act of 1974, (ERISA), Sections 404(a)(1), 406(b), 408(b)(1) and IRC Section 4975(d)(1).

In an embodiment, the volatility index described above is used to determine whether based on current conditions, the plan has the appropriate asset balance based on the current amount of loans outstanding. As such, the current asset balance may be compared to the daily results of the volatility index within some confidence level to verify that the asset balance, to some level of confidence within some window of time, will remain greater than the amount required based on the current loan amount outstanding or a proposed loan amount.

In another embodiment, different method is used in which a series of weighted factors are employed from three primary related loan security applications: 1) the application of traditional investment principles applying to "margin trading accounts" secured by the underlying security under Reg T; 2) commercial consumer lending practices under Comptroller of the Currency Regulations; and 3) the ERISA fiduciary prudence requirements of Title I of ERISA.

The weighted factors are related mathematically to form an algorithm referred to as the "ERISA Loan Security Volatility Index." Using data for the factors as an input, the output of the algorithm is a "Volatility Index Score." The algorithm is designed so that the Volatility Index Score provides a relative measure of the adequacy of the security for the loan (the participant's remaining account balance) and the likelihood of the security being inadequate or becoming inadequate relative to the outstanding balance of the loan, at the time the loan is granted, and thereafter during the life of the loan until fully paid off.

The ERISA Loan Security Volatility Index will be periodically tested against actual data from prior periods. The accuracy of the ERISA Loan Security Volatility Index will then be adjusted by changing weighting of the factors, the factors used and the algorithm to more accurately model the past data related to the adequacy of the security for the loan (the participant's remaining account balance) and the likelihood of the security being inadequate or becoming inadequate relative to the outstanding balance of the loan, at the time the loan is granted, and thereafter during the life of the loan until fully paid off.

The ERISA Loan Security Volatility Index will be developed and maintained by independent experts in the three disciplines of margin trading loans, commercial and retail consumer loans, and ERISA fiduciary principles. Each expert will develop and monitor not less than five factors related to each loan, and will assign a weight to each factor. The factors will become part of the loan application through questions developed by the experts to measure the factors for each discipline. The participant's and plan sponsor's answers will determine the score for that questions. The sum of the scores for each answer becomes the Volatility Index.

The factors and their weight are dynamic and may change with changes in market, economic or other circumstance or conditions generally, with respect to the plan making the loan and with respect to the qualification of the plan itself. Potential factors include: the volatility of the public stock in the account balance to be used as security; the age and health of the participant; the diversification of the account balance investments; whether it consists solely of employer stock; whether payroll deduction payback of the loan is automatic; the length of the loan payback period; whether fiduciary controls are in place to monitor the operation of the plan's loan program; the prior credit history and prior plan loans; the IRS qualification of the plan; prior IRS or Department of Labor audits of the plan; and the existence of an independent fiduciary audit control program.

The Volatility Index score is determined by the sum of the weighted factors, based on the answers to the questions developed by the experts as part of the loan application, answered by both the participant borrower and the plan sponsor.

In an embodiment, the algorithm will be normalized so that volatility index score of 100 or higher represents that the security is adequate for the loan balance, based on the remaining loan balance. Scores of 80 to 100 mean that the adequacy is at risk and needs to be monitored more closely. Scores below 80 mean that the remaining account balance is insufficient for the loan balance and that the loan should not be granted, should be called, or additional security required. This could be as simple as reducing the amount of the loan to be granted to less than the 50% maximum of the account balance allowed by law, requiring credit life insurance to be purchased, or a financial statement showing other assets available as security on either a dedicated basis or simply as other assets of the borrower.

Figure 3:
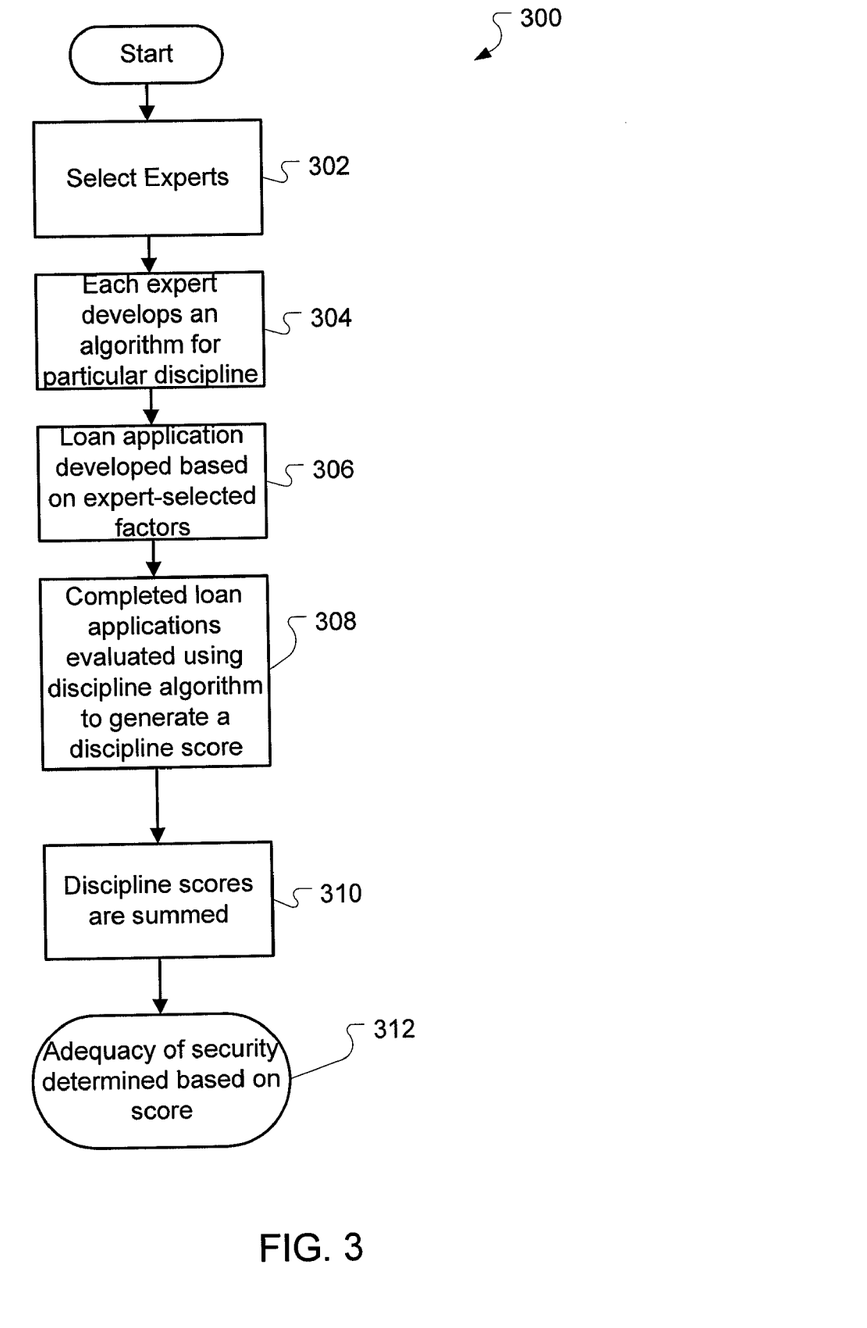
FIG. 3 is a flow chart illustrating the logical operations of an embodiment of a method for measuring the adequacy of the security required under the fiduciary prudence and prohibited transaction provisions of ERISA.

FIG. 3 is a flow chart illustrating the logical operations of an embodiment of a method 300 for measuring the adequacy of the security required under the fiduciary prudence and prohibited transaction provisions of ERISA.

The method 300 starts with selecting an expert in each of the three disciplines of margin trading loans, commercial and retail consumer loans, and ERISA fiduciary principles in a select experts operation 302.

Each expert will develop and monitor not less than five factors related to each loan, and will assign a weight to each factor in an discipline algorithm generation operation 304. Each discipline algorithm will provide a relative measure of the adequacy of the security for the loan within the discipline as evaluated by the expert.

The factors are reported to the assessor are used to create a loan application for use by the plan in a create loan application operation 306. The loan application may include questions developed by the experts to measure the factors for each discipline.

Completed loan applications are then evaluated in an evaluation operation 308 using the algorithms created by the experts. The results of the evaluation operation 308 include a set of scores based on the information in the loan application. In an embodiment, the evaluation operation 308 results in a score for each of the answers in the completed loan application. The participant's and plan sponsor's answers will determine the score for each question.

The scores are then combined in a summation operation 310 to generate a Volatility Index score for the loan application. In an embodiment, the sum of the scores for each answer becomes the Volatility Index score. In another embodiment, separate discipline scores are generated by the evaluation, which are then summed in summation operation 310.

Subsequently, in an adequacy determination operation 312 the Volatility Index score is then used to determine the adequacy of the security for the loan (the participant's remaining account balance), the likelihood of the security being inadequate or becoming inadequate relative to the outstanding balance of the loan, at the time the loan is granted, and thereafter during the life of the loan until fully paid off. Finally, based on the volatility index score, a loan may or may not be approved.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they come within the scope of the appended claims and their equivalents.

What is claimed is:

1. A method for offering insurance products to a potential purchaser without performing a complete audit of the potential purchaser, comprising:
   developing a questionnaire corresponding to a first insurance product;
   identifying standards for evaluating the questionnaire;
   providing the questionnaire to the potential purchaser of the first insurance product, the questionnaire requiring confidential information from the potential purchaser;
   requesting the potential purchaser to complete the questionnaire;
   submitting a completed questionnaire to a third party to confidentially evaluate the completed questionnaire based on the standards, the completed questionnaire including confidential information of the potential purchaser;
   receiving, by an offeror, from the third party a non-confidential result of the evaluation, the non-confidential result including a recommendation to offer or not to offer the first insurance product to the potential purchaser based on the standards;
   offering, by the offeror, the first insurance product to the potential purchaser when the recommendation is to offer the first insurance product; and
   maintaining, by the third party, the confidential information of the potential purchaser in confidence between the potential purchaser and the third party, including maintaining the confidential information confidential from the offeror of the first insurance product,
   wherein the providing step, the requesting step, the submitting step, the receiving step, and the offering step are performed on at least one particular machine, said at least one particular machine comprising at least one physical computing device;
   wherein the third party is a law firm offering legal services including corporate audit services and insurance defense services and maintaining further comprises using the third party as counsel for the plan sponsor in the event of a claim covered by the first insurance product;
   wherein maintaining further comprises requiring the potential purchaser to execute a waiver permitting the third party to disclose the evaluation result of the questionnaire in the event of a claim covered by the first insurance product.

2. The method of claim 1 wherein the developing and identifying are performed jointly by the third party and the offeror of the first insurance product.

3. The method of claim 1 further comprising:
performing, by the third party, a confidential audit to verify at least some information on the completed questionnaire.

4. The method of claim 1 further comprising:
developing a second questionnaire corresponding to a second insurance product;
identifying second standards for evaluating the second questionnaire;
based on the non-confidential result of the evaluation received from the third party, requesting the potential purchaser to complete the second questionnaire;
submitting a completed second questionnaire to the third party to confidentially evaluate the completed second questionnaire based on the second standards, the completed second questionnaire including second confidential information of the potential purchaser;
receiving, by an offeror of the second insurance product, from the third party a second non-confidential result of the evaluation, the second non-confidential result including a recommendation to offer or not to offer the second insurance product to the potential purchaser;
offering, by the offeror of the second insurance product, the second insurance product to the potential purchaser when the recommendation is to offer the second insurance product; and
maintaining, by the third party, the second confidential information of the potential purchaser in confidence between the potential purchaser and the third party, including maintaining the second confidential information confidential from the offeror of the first insurance product and the offeror of the second insurance product.

5. The method of claim 4 further comprising:
if the second non-confidential result includes a recommendation not to offer the second insurance product to the potential purchaser without additional information, performing an audit corresponding to the second insurance product, whereby the potential purchaser undergoes the audit to determine eligibility for the second insurance product.

6. The method of claim 4 further comprising:
performing a periodic review to determine whether to renew the first insurance product, whereby the potential purchaser is periodically offered an insurance product having a coverage level greater than the coverage level associated with the first insurance product if the potential purchaser is eligible based on results of an analysis of a completed questionnaire corresponding to the insurance product having the greater coverage level.

\* \* \* \* \*